(No Model.)
E. C. E. & L. L. LABOIS.
Manufacture of Carbon Bisulphide and Sulphuric Acid from Pyrites, and Apparatus therefor.
No. 233,680.      Patented Oct. 26, 1880.
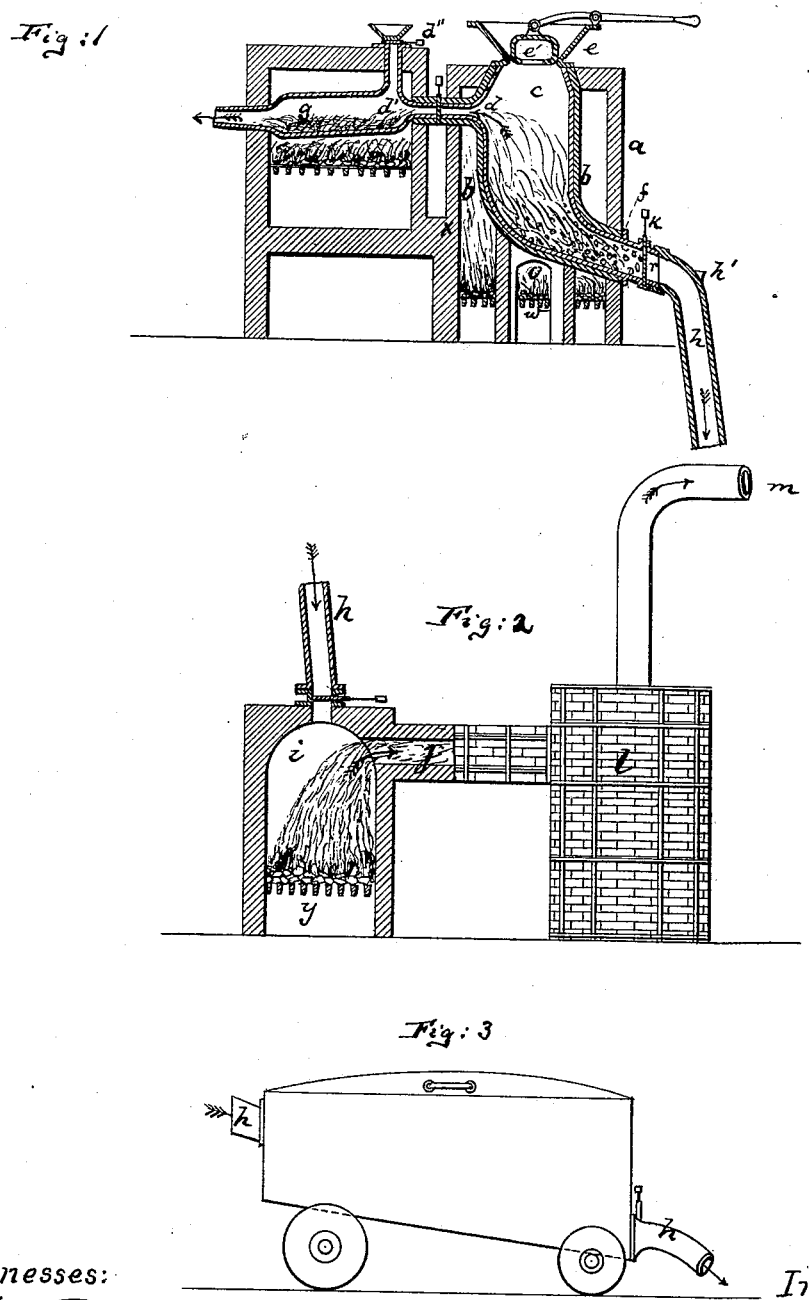
Witnesses:
H. F. Parker
John C. Tunbridge.
Inventors:
E. C. E. Labois
L. L. Labois
by their attorney
A. v. Briesen

UNITED STATES PATENT OFFICE.

ELIE C. E. LABOIS AND LÉON L. LABOIS, OF PARIS, FRANCE.

MANUFACTURE OF CARBON BISULPHIDE AND SULPHURIC ACID FROM PYRITES AND APPARATUS THEREFOR.

SPECIFICATION forming part of Letters Patent No. 233,680, dated October 26, 1880.

Application filed May 11, 1880. (No model.) Patented in France October 18, 1879.

*To all whom it may concern:*

Be it known that we, ELIE CÉLESTIN ERNEST LABOIS and LÉON LOUIS LABOIS, chemists, both of the city of Paris, in the Republic of France, have invented an improved and economical method of manufacturing sulphuret of carbon and sulphuric acid from the pyrites of iron and copper simultaneously and in the apparatus for the purpose of such manufacture; and we do hereby declare that the following is a full and exact description thereof, and that we have obtained French Patent No. 133,244, for fifteen years from October 18, 1879, for the said invention.

Sulphur in a pyritic state is more difficult to extract by distillation than when it is held in *solfatara* earth, and if the operation is carried to completion after a great consumption of fuel, the result would merely be to extract from one hundred kilograms of chemically-pure pyrites about twenty-six to twenty-seven kilograms of sulphur, the pyrites only containing from forty to forty-six per cent. of sulphur. By this method from twenty to twenty-three kilograms is all that is obtained.

The object of this invention is to extract by distillation of the pyrites the greatest amount of sulphur until distillation ceases to be remunerative, which will occur when the first equivalent of sulphur is nearly eliminated, and then immediately afterward to use the irreducible residue while still hot in the manufacture of sulphuric acid.

From the successive operations to which the pyrites are submitted a considerable saving of raw material, labor, and fuel results.

In the accompanying drawings, as example, an apparatus is shown capable of practically effecting the objects above mentioned.

Figure 1 is a vertical section of an apparatus for manufacturing carbon bisulphide. Fig. 2, which is intended to be connected to the preceding by a canal or conduit, also shows, in section, the first apparatus requisite for obtaining the sulphuric acid.

In a suitable furnace, $a$, a retort, $b$, of refractory earth is arranged, or it may be of sheet-iron japanned, supplied with three branches, $c$, $d$, and $f$. The upper branch, $c$, is continued by a hopper, $e$, furnished with a plug, $e'$, and in which the pyrites to be treated are contained. The second branch, $d$, is continued by a conduit, $d'$, which joins the wood-charcoal retort $g$. The conduit $d'$ is intercepted by the damper $d''$. Finally, the third branch $f$, or lower one, is continued by a canal, $h$, in refractory earth or in cast-iron, closed as hermetically as possible, and which establishes the connection of the retort $b$ with the first apparatus for the production of the sulphuric acid.

In connecting the retort $b$ to the furnace $i$ by the canal $h$, one can, for example, employ the tube $k$, of cast-iron, with damper $r$, or any other suitable contrivance.

The canal $h$ abuts on the furnace $i$, which is continued by a chimney, $j$. This enters the furnace $l$, where the dust, which is drawn along, is deposited, thence the gases proceed, by a cast-iron pipe, $m$, first to a leaden cylinder, where they are collected, and thence to succeeding cylinders, where the purified sulphuric-acid gases are collected, as is now practiced by known methods.

During the first operation the tube $k$, which can leave the end of the channel $h$ free, is merely closed by the japanned register $r$, or by this register and a cover of refractory earth, which must be destroyed before connecting the channel $h$ with pipe $k$, and before the opening of the register. From an opening, $h'$, it is easy to unstop the canal $f$ of the retort and draw down the pyrites with a poker or other implement.

In the distilling-retort $b$ the pyrites are placed in sufficient quantity. Heat is then applied by the combustion of charcoal charged through the orifice $o$. The vapors disengaged through the tube $d$ are to be submitted to the influence of the incandescent coal at $d'$, and so produce carbon bisulphide, which is then treated in the usual manner.

The wood-charcoal under the first retort $b$ may be partly mixed with other fuel; but care must be taken not to heat the first retort at too high a temperature to avoid melting the mineral and destroying the retort.

When sulphur only is to be obtained the conduit $d$ leads the vapors into a condensing-chamber, as is usually practiced. When the pyrite has parted with about fifteen per cent.

of its weight or fifteen kilograms of sulphur for one hundred kilograms of pyrites and more, (which will be experimentally determined,) the register $d''$ is closed, and having removed the refractory earth cover of the tube $k$, the branching or connecting of the tube $h$ being effected, the register $r$ is opened to make the hot pyrites slide down the tube $h$ to the grates of the furnace $i$, for making sulphuric acid.

The whole of the first equivalent may be removed, but, as observed, caution is necessary to avoid melting the mineral. For this reason a mean distillation of fifteen per cent. is taken for rich pyrites at forty-five per cent. of sulphur.

It is scarcely necessary to remark that the distilling-retort $b$ is placed above the grate $w$ and separated from it by a greater or less length of channel or pipe, and is also isolated by a division or wall, $x$.

It has been observed that before opening the register $r$ for discharging the hot pyrites, the register $d''$ is closed to prevent the entrance of gas in the retort. When the retort $b$ is discharged the register $r$ is closed and the mineral is introduced at $e'$. The retort being filled to a suitable height it is closed and luted above and below, the register $d''$ having been opened and the operation recommenced.

The determination of the time necessary for obtaining the twelve to fifteen per cent. of sulphur (and more) from the pyrites in the first operation is obtained with respect to the dimensions of the apparatus, the intensity of the heat of the fire, the nature of the mineral, &c. In other respects it is of little importance, as what is lost in the first operation is regained by the second. The pyrites leaving the retort $b$ reach the grates $y$ of the furnace $i$ by the pipe $h$, and, absorbing oxygen from the surrounding air, they lose about twenty-five to thirty per cent. of sulphur in the next apparatus, which is shown in Fig. 2.

In place of the conduit $h$, Figs. 1 and 2, if local requirements necessitate too great a separation of the two apparatus the hot pyrites can be transported by a closed barrow, a specimen of which is shown at Fig. 3, or any other suitable contrivance may be used. Again, instead of treating the pyrites by a first operation in the distilling-retort and in a special apparatus, and then by a second operation immediately succeeding it in an apparatus for making sulphuric acid, one can, as before, profit by the economy resulting by the immediately-succeeding operations—that is to say, take advantage of the heat the residues possess from the first operation by proceeding as follows: In a suitable retort a first distillation is effected in the limits above assigned, evacuating the products of this distillation by a conduit similar to that of $d$ in the first apparatus, then closing this conduit, or a similar one is opened to those of the sulphuric-acid apparatus, air is introduced to the residues requisite to encourage the utmost elimination of sulphur they contain. In a word, the two operations succeeding each other can be effected in a single apparatus, first serving for distillation and then calcining.

We desire it to be clearly understood that we intend to use our apparatus for obtaining, by distillation of the pyrites of iron, copper, and galena, carbon bisulphide, and sulphuric acid, and any other product that the said pyrites may contain, especially sulphur and its derivatives always simultaneously with sulphuric acid.

We claim as our invention—

1. In the manufacture of carbon bisulphide and sulphuric acid from pyrites, the method herein described, consisting in first extracting from a determined quantity of pyrites a limited proportion of sulphur, which is afterward, in a separate retort, combined with carbon, and in then conducting the hot residues of the pyrites to the grates of a separate furnace and producing therefrom directly sulphuric acid in the ordinary manner, substantially as specified.

2. The apparatus shown, consisting of a distilling-retort, $b$, with three branches, $c\ d\ f$, situated in an appropriate furnace, in combination with the retort $g$ and conduit $h$, substantially as herein shown and described.

3. The retort $b$, having openings $b$, $d$, and $f$, in combination with the retort $g$, conduit $h$, furnace $i$, tubes $j$, and receiver $l$, substantially as herein shown and described.

ELIE CÉLESTIN ERNEST LABOIS.
LÉON LOUIS LABOIS.

Witnesses:
C. VULÉTRU,
A. BLÉTRIZ.